United States Patent Office 3,444,234
Patented May 13, 1969

3,444,234
AMMONIA RECOVERY WITH A MOLTEN SALT IN PROCESSES FOR THE PRODUCTION OF MONO-OLEFINICALLY UNSATURATED NITRILES
James L. Callahan, Bedford Heights, and Gordon G. Cross, Chagrin Falls, Ohio, assignors to The Standard Oil Company, Cleveland, Ohio, a corporation of Ohio
No Drawing. Filed Nov. 9, 1966, Ser. No. 592,992
Int. Cl. C07c *121/02, 121/04*
U.S. Cl. 260—465.3          5 Claims

ABSTRACT OF THE DISCLOSURE

A process for the recovery of and recycle of excess ammonia from reactors used in the ammoxidation of monoolefins to unsaturated nitriles, wherein a molten salt or a mixture of molten salts of phosphoric and sulfuric acids in the temperature range from about 300° F. to about 700° F. is used to absorb the reactor effluent, which is then desorbed by heating the molten salt. The desired organic compounds are recovered and ammonia is recycled to the reactor.

---

The present invention relates to a process for the recovery of ammonia from reactors in which ammonia, in excess of the theoretical amount required for reaction, is used. More particularly, it relates to the recovery and recycle of excess ammonia from reactors used in the ammoxidation of olefins to unsaturated nitriles.

The production of monoolefinically unsaturated nitriles is carried out by several processes, the most successful being the ammoxidation of an olefin over a supported metal oxide catalyst in a fixed bed or fluidized bed reactor. The reactions in the reactor are such that they are aided by the presence of an excess of ammonia in the feed stream to the reactor. This economic burden is increased by the additional costs of eventually disposing of this excess ammonia in the form of valueless by-product compounds.

Particularly desirable processes and catalysts for the manufacture of α-β monoolefinically unsaturated nitriles are disclosed in U.S. Patents 2,904,580 and 3,198,750.

In the processes described in the above-mentioned patents a gaseous feed stream comprising an olefin, ammonia and a molecular-oxygen-containing gas such as air, are contacted with a finely divided oxidation catalyst preferably in a fluid-bed reactor. Effluent from the reactor comprises the desired unsaturated nitrile, unreacted ammonia, inert gases, water vapor, catalyst "carry-over" and other by-products of reaction.

It will be noted that in the above-mentioned ammoxidation processes an excess of ammonia is desirable if good yields are to be obtained. It has been the practice to remove this excess unreacted ammonia from the hot reactor effluent by spraying dilute mineral acid in the reactor effluent, forming the acid salt. The cost of subsequently recovering the salt in salable form, added to the cost of acid consumed, is barely offset by the sale of the salt. In other words, it would be economically desirable both to eliminate the cost of acid and to reuse the unreacted ammonia in the process. The process of the instant invention does so.

The process of the instant invention provides a method of trapping the excess ammonia in the reactor effluent by absorption in a molten salt or acid melt and then selectively releasing the trapped ammonia from the molten salt for reuse in the reactor.

It is known that unsaturated nitriles such as acrylonitrile and methacrylonitrile are substantially insoluble in, and relatively unaffected by certain molten salts. The copending U.S. patent application Ser. No. 454,732, now U.S. Patent 3,377,378, of John F. Jones discloses that carboxylic acid esters can be formed by reacting a nitrile with water and an olefin in the presence of acid melts and recovering the ester. Acid melts are such substances as contain acid hydrogen atoms, and the terms "acid melt" and "molten salt" are used herein to signify this type of melt. Preferably, the acid salts of phosphoric or sulfuric acid, especially the alkali metal and ammonium acid salts of such acids, are employed for the production of such melts. Most preferred salts are the bisulfates and sulfates of sodium and potassium.

It is desirable to select an acid melt which melts at a suitably low temperature that will be a good ammonia absorber, that will not affect the unsaturated nitrile, and that will not decompose on heating to a higher temperature during the ammonia desorption step of the process. Moreover, the composition of the acid melt should be chosen not only for its ability to absorb ammonia fast, but also for its ability to release absorbed ammonia quickly during the desorption step. Salts which make good acid melts are the sulfates, bisulfates, chlorides and phosphates of the alkali metals and the alkaline earth metals. Preferred salts are the bisulfates and sulfates of sodium and potassium.

The temperature of the molten salt should be such as to absorb substantially all excess ammonia. This requriement dictates that the temperature be not so high as to cause the vapor pressure of ammonia to be a problem.

It is not necessary that the acid melt utilized be a homogeneous liquid phase. Molten salts used may contain solids as well as dissolved gases.

An object of the instant invention is to provide a process for the recovery and recycle of ammonia by absorbing unreacted ammonia from a reactor effluent stream into a molten salt comprising at least one of the following salts: sodium bisulfate, potassium bisulfate, ammonium bisulfate, ammonium hydrogen phosphate, lithium hydrogen sulfate and ammonium nitrate and regenerating the molten salt by heating it to a higher temperature to effect ammonia desorption.

Another object of the instant invention is to provide a process for the acidic quenching of hot reactor effluent gases with a molten salt to minimize the formation of unwanted by-products.

The following description of the instant invention is specifically with respect to a fluid bed acrylonitrile or methacrylonitrile reactor but is equally applicable with obvious modifications, to a fixed reactor.

Ammonia, propylene and air in the proportions disclosed in U.S. Patent No. 2,904,580 are fed to a fluid-bed reactor in which an appropriate oxidation catalyst is fluidized by the incoming gaseous reactants. Products of reaction, including unreacted ammonia in the reactor effluent at about 700–1000° F. are heat-exchanged with one or more of the cool incoming gaseous reactants so as to lower the reactor effluent temperature. Normally, this would be done in a shell and tube heat exchanger wherein the reactor effluent would be in the shell side and the incoming gaseous reactants would be in the tube side. As the reactor effluent flows through the heat exchanger it is contacted with molten salt sprayed into the exchanger both to lower the temperature of the reactor effluent by direct contact as well as to absorb at least some unreacted ammonia. The reactor effluent including the molten salt sprayed into it is bubbled through a molten salt absorber. Substantially all ammonia, catalyst "carry-over," and some organic "heavies," are absorbed in the molten salt in the absorber. The non-absorbed reactor effluent gases comprising acrylonitrile, hydrogen cyanide, acetonitrile and water vapor are led to a cold water absorber in which the organic products of reaction are soluble. The aqueous solution is then treated by conventional means to recover the products separately.

Bottoms from the molten salt absorber is rich in ammonia and is called "rich melt." This rich melt is then heated to a higher temperature and led into the top of an ammonia stripper where the ammonia is stripped from the melt. It is not necessary to drive off all the ammonia from the rich melt in the ammonia stripper since "lean melt" from the bottom is recycled to the absorber. The fact that some ammonia will usually be present in the lean melt is relatively unimportant so long as the ammonia level does not exceed an equilibrium value under the conditions employed.

It must be kept in mind that, though the precise reaction mechanisms are not certain, it is presumed that the absorption of $NH_3$ in the molten salt includes a plurality of equilibrium reactions, the main one being:

$$NH_3 + HSO_4^- \rightleftharpoons NH_4HSO_4^-$$

on absorption, and $$NH_4HSO_4^- \rightleftharpoons NH_3 + HSO_4^-$$

on desorption.

A secondary reaction is thought to be:

$$NH_3 + 2HSO_4^- \rightleftharpoons NH_4HSO_4^- + SO_4^=$$

on absorption, and $$NH_4HSO_4^- + SO_4^= \rightleftharpoons NH_3 + 2HSO_4^-$$

on desorption.

During the description step a certain amount of free ammonia is always present due to the partial pressure exerted by the ammonia at the desorption conditions of temperature and pressure; the higher the temperature at any given pressure, the higher the partial pressure.

The removal of ammonia in the stripper is facilitated by the injection of an inert gas such as steam, hydrogen, nitrogen, carbon dioxide, or air into the stripper. The use of a stripping medium to sweep away gaseous ammonia from the molten salt forces the release of more adsorbed ammonia to maintain the equilibrium required by the reactions. Consequently, it is possible to absorb ammonia into the salt at a particular temperature at which ammonia exerts a sufficient partial pressure and then to desorb the ammonia at the same temperature and total pressure provided a suitable amount of stripping medium is used.

It is particularly economical to utilize a molecular oxygen containing gas such as air as the stripping medium and to lead the effluent from the ammonia stripper, which will be essentially air enriched with ammonia, back to the reactor. It will be apparent that stripping air used in this manner will be heated by direct contact with the molten salt and at the same time serve to return desorbed ammonia for further reaction.

Some water formed in the reaction may remain in the rich melt but substantially all of the water will be driven off with the ammonia.

It has been found that the presence of water is helpful in maintaining the bisulfate salts in that state. Dehydration of the bisulfates if permitted to occur, results in formation of the pyrosulfates which may further result in the formation of sulfates and sulfites. These oxidation states, other than the bisulfate, are relatively high melting and increase the temperature at which the molten salt may be kept fluid.

British Patent No. 743,295 discloses a process relating to the recovery of ammonia and hydrogen chloride from ammonium chloride using water to control the fluidity of the melt. Belgian Patent No. 643,789 indicates that water may be used to accelerate the release of ammonia from the salt. Any convenient quantity of water, inert organic or inorganic stripping fluid may be used. Because water is readily absorbed in the molten salt at lower temperatures and has to be subsequently driven off, it is preferred that water added be in the range from 0.1 to 10 percent by weight and that the water be added in the form of steam.

The addition of water may also be accomplished by addition of the hydrated salts which would quickly lose their water of hydration and strip off the ammonia.

The amount of water to be added is related to both the stripping agent employed and to the mass flow of molten salt in the stripper. The preferred requirement for added water is between about 0.25 and 2 percent by weight of the water-free stripping agent circulated through the stripper.

Though the best results were obtained using molten salt by itself, as the absorption medium, acceptable results were also obtained using molten salt deposited on supports such as silica, alumina, carborundum and alundum.

Absorption runs made at temperatures below about 550° F. indicated that organic matter was being trapped in the salt imparting a brown color to it. Absorption runs made at about 600° F. and over, were clean. At higher temperatures, about 800° F., all traces of organic material completely disappear, and the molten salt stays white. However, as will be seen from the results hereinafter set forth, not only does the capacity of the molten salt to absorb ammonia decrease rapidly as its temperature is increased beyond 700° F., but considerable amounts of sulfur dioxide are formed, apparently by the decomposition of the molten salt.

The process of the instant invention was carried out as indicated in the following examples in which "parts" means "parts by weight" unless otherwise stated.

Examples I–III 50.4 parts sodium bisulfate ($NaHSO_4 \cdot H_2O$) were mixed with 49.6 parts potassium bisulfate ($KHSO_4$) in a kettle heated by a furnace until a molten salt mass was formed. The molten salt was pumped into an absorber, also called a molten salt absorber, equipped with an agitator. Reactor effluent, from an acrylonitrile producing reactor, was led into the absorber beneath the level of the molten salt. The temperature of the molten salt was monitored at several locations within the molten salt absorber. The temperature was adjusted by the raising or lowering of the heat duty of the furnace heating the kettle. Rich melt was withdrawn from the bottom of the molten salt absorber, brought up to temperature in the kettle, and pumped back to the absorber. The molten salt was thus recycled continuously at a predetermined temperature for a period of one hour at the end of which period all the molten salt was collected in the kettle. The absorber was isolated from the system and a stripper column, also called the ammonia stripper, was connected so as to allow rich melt from the kettle to be pumped to the stripper.

The temperature in the stripper was monitored at several points. In addition, provision was made for the injection of steam and air, both into the transfer line from the kettle to the stripper, as well as into the stripper.

Each absorption run was preceded by a "blank" recovery run on the reactor effluent during which the quantities of acrylonitrile and other reaction products evolved were determined by analysis. Having determined the acrylonitrile output of the reactor, the reactor effluent was then led into the absorber and the molten salt was recyled through the absorber for the duration of the absorption step, namely one hour. In the table below all absorption runs were made at 600° F. The ammonia absorbed per 100 parts molten salt varies because the reactor did not operate at precisely the same yields on successive days.

TABLE I

| Example | Absorption temp., °F. | Ammonia absorbed | Desorption temp., °F. | Ammonia retained after desorption | Ammonia recovered | Desorption time, min. |
|---|---|---|---|---|---|---|
| I | 600 | 4.4 | 600 | 1.1 | 2.1 | 160 |
| II | 600 | 3.8 | 700 | 0.3 | 2.9 | 190 |
| III | 600 | 3.8 | 800 | 0.0 | 3.6 | 130 |

[All figures in columns refer to parts NH3 per one hundred (100) parts of molten salt, unless otherwise specified]

We claim:
1. In a process for the manufacture of $\alpha$–$\beta$ monoolefinically unsaturated nitriles comprising contacting in the vapor phase a mixture of an olefin having from three to five carbon atoms, ammonia and oxygen with an oxidation catalyst in a reactor, the improvement consisting of (a) contacting the effluent from the reactor in the vapor phase with a molten salt selected from the group consisting of the acid salts of phosphoric and sulfuric acids in the temperature range from about 300° F. to about 700° F.; (b) withdrawing at least a portion of said acid salts together with absorbed reactor effluent; (c) heating said portion of said acid salts in the range from about 500° F. to about 1000° F. to effect desorption of said absorbed reactor effluent, and (d) recycling desorbed reactor effluent to said reactor.

2. The process of claim 1 comprising after step (c) and before step (d) stripping said portion of said acid salts with a molecular oxygen-containing gas.

3. The process of claim 1 wherein step (c) comprises simultaneously heating said acid salts and stripping with a molecular oxygen-containing gas said portion of said acid salts.

4. The process of claim 1 wherein the $\alpha$–$\beta$ monolefinically unsaturated nitrile is acrylonitrile.

5. The process of claim 1 comprising after step (b) adding from about 0.1 to 10 percent by weight water based on water-free stripping gas.

References Cited

UNITED STATES PATENTS 3,280,166   10/1966   Callahan et al. _____ 260—465.3

JOSEPH P. BRUST, *Primary Examiner.*